(12) United States Patent  
Maeng et al.

(10) Patent No.: US 9,907,327 B2
(45) Date of Patent: Mar. 6, 2018

(54) REFRIGERATOR WITH ULTRAVIOLET LIGHT EMITTING DIODE

(71) Applicant: LG INNOTEK CO., LTD., Seoul (KR)

(72) Inventors: Ji Hyoung Maeng, Seoul (KR); Dong Nyung Lim, Seoul (KR); Sang Jun Hong, Seoul (KR); Young Suck Byun, Seoul (KR); Dae Soo Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 277 days.

(21) Appl. No.: 14/684,751

(22) Filed: Apr. 13, 2015

(65) Prior Publication Data

US 2015/0216222 A1    Aug. 6, 2015

Related U.S. Application Data

(63) Continuation of application No. 13/270,753, filed on Oct. 11, 2011, now Pat. No. 9,028,084.

(30) Foreign Application Priority Data

Oct. 8, 2010  (KR) .................. 10-2010-0098457
Oct. 8, 2010  (KR) .................. 10-2010-0098461

(Continued)

(51) Int. Cl.
*A23L 3/28*    (2006.01)
*F25D 23/00*   (2006.01)

(Continued)

(52) U.S. Cl.
CPC .............. *A23L 3/28* (2013.01); *F25D 17/042* (2013.01); *F25D 23/00* (2013.01); *F25D 27/00* (2013.01); *F25D 2317/0417* (2013.01)

(58) Field of Classification Search
CPC ......... A23L 3/28; F25D 23/00; F25D 17/042; F25D 27/00; F25D 2317/0417

(Continued)

(56) References Cited

U.S. PATENT DOCUMENTS 2,906,104 A * 9/1959 Schaefer .................... A23L 3/28
                                                        362/35
5,873,646 A * 2/1999 Fjaestad .................. F21V 7/005
                                                        362/125

(Continued)

*Primary Examiner* — Sharon Payne
(74) *Attorney, Agent, or Firm* — Birch, Stewart, Kolasch & Birch, LLP

(57) ABSTRACT

A refrigerator with an ultraviolet LED may be provided that includes: a first wall surface; a second wall surface; a reflector disposed between the first wall surface and the second wall surface, and comprising an inner curved surface and an outer surface disposed on the first wall surface and the second wall surface; a first base disposed on a first end of the inner curved surface of the reflector; a second base disposed on a second end of the inner curved surface of the reflector; a first ultraviolet LED being disposed on the first base, and configured to emit ultraviolet lights to the inner curved surface of the reflector; and a second ultraviolet LED being disposed on the second base, and configured to emit ultraviolet lights to the inner curved surface of the reflector.

20 Claims, 18 Drawing Sheets

(30) Foreign Application Priority Data

| | | |
|---|---|---|
| Oct. 8, 2010 | (KR) | 10-2010-0098462 |
| Oct. 8, 2010 | (KR) | 10-2010-0098464 |
| Oct. 8, 2010 | (KR) | 10-2010-0098465 |
| Oct. 8, 2010 | (KR) | 10-2010-0098467 |
| Oct. 8, 2010 | (KR) | 10-2010-0098470 |
| Nov. 3, 2010 | (KR) | 10-2010-0108902 |
| Nov. 3, 2010 | (KR) | 10-2010-0108909 |
| Nov. 4, 2010 | (KR) | 10-2010-0109360 |

(51) Int. Cl.
*F25D 17/04* (2006.01)
*F25D 27/00* (2006.01)

(58) Field of Classification Search
USPC .......................................... 362/92
See application file for complete search history.

(56) References Cited

U.S. PATENT DOCUMENTS

| | | | | |
|---|---|---|---|---|
| 7,121,680 B2* | 10/2006 | Galli | ............... | F21V 29/004 |
| | | | | 362/202 |
| 7,722,220 B2* | 5/2010 | Van De Ven | ....... | F21V 29/2212 |
| | | | | 362/294 |
| 7,854,534 B2* | 12/2010 | Liu | ............... | F21V 15/01 |
| | | | | 362/294 |
| 2008/0186695 A1* | 8/2008 | Awai | ............... | F25D 27/005 |
| | | | | 362/92 |

* cited by examiner

REFRIGERATOR WITH ULTRAVIOLET LIGHT EMITTING DIODE

CROSS-REFERENCE TO RELATED APPLICATION

This application is a Continuation Application of U.S. application Ser. No. 13/270,753 filed on Oct. 11, 2011, which claims priority under 35 U.S.C. § 119 from Korean Patent Application No. 10-2010-0109360, filed in the Republic of Korea on Nov. 4, 2010, Korean Patent Application No. 10-2010-0108909, filed in the Republic of Korea on Nov. 3, 2010, Korean Patent Application No. 10-2010-0108902, filed in the Republic of Korea on Nov. 3, 2010, Korean Patent Application No. 10-2010-0098457, filed in the Republic of Korea on Oct. 8, 2010, Korean Patent Application No. 10-2010-0098462, filed in the Republic of Korea on Oct. 8, 2010, Korean Patent Application No. 10-2010-0098470, filed in the Republic of Korea on Oct. 8, 2010, Korean Patent Application No. 10-2010-0098464, filed in the Republic of Korea on Oct. 8, 2010, Korean Patent Application No. 10-2010-0098461, filed in the Republic of Korea on Oct. 8, 2010, Korean Patent Application No. 10-2010-0098467, filed in the Republic of Korea on Oct. 8, 2010, and Korean Patent Application No. 10-2010-0098465, filed in the Republic of Korea on Oct. 8, 2010, the subject matters of which are incorporated herein by reference.

BACKGROUND

1. Field

Embodiments may relate to a refrigerator with an ultraviolet light emitting diode.

2. Background

In general, a refrigerator is a home appliance for storing food and drink at a low temperature in its internal space shielded by a door. The refrigerator refrigerates the inside of its storage space by using refrigerant circulating at a refrigeration cycle and cool air generated from heat exchange, so that food and drink can be optimally stored.

As such, due to the change of dietary life and variety of users' preference, a refrigerator has a tendency to become larger and multi-functional. The storage space provides various housing spaces such as a drawer, a shelf and a basket. The inside of the refrigerator includes a lighting device for illuminating the inside thereof at the time of opening the door of the refrigerator.

However, the refrigerator does not include a means for effectively removing harmful substances and bacteria within the refrigerator.

SUMMARY

A refrigerator with an ultraviolet LED, the refrigerator may comprise: a first wall surface; a second wall surface; a reflector disposed between the first wall surface and the second wall surface, and comprising an inner curved surface and an outer surface disposed on the first wall surface and the second wall surface; a first base disposed on a first end of the inner curved surface of the reflector; a second base disposed on a second end of the inner curved surface of the reflector; a first ultraviolet LED being disposed on the first base, and configured to emit ultraviolet lights to the inner curved surface of the reflector; and a second ultraviolet LED being disposed on the second base, and configured to emit ultraviolet lights to the inner curved surface of the reflector.

A refrigerator with an ultraviolet LED, the refrigerator may comprise: an innernal wall comprising a plurality of corners; a curved reflector disposed on at least one corner of the plurality of corners; a base disposed on at least one end of both ends of the curved reflector; and a plurality of ultraviolet LEDs disposed on the base and configured to emit ultraviolet lights to the reflector.

BRIEF DESCRIPTION OF THE DRAWINGS

Arrangements and embodiments may be described in detail with reference to the following drawings in which like reference numerals refer to like elements and wherein.

DETAILED DESCRIPTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

Figure 1:
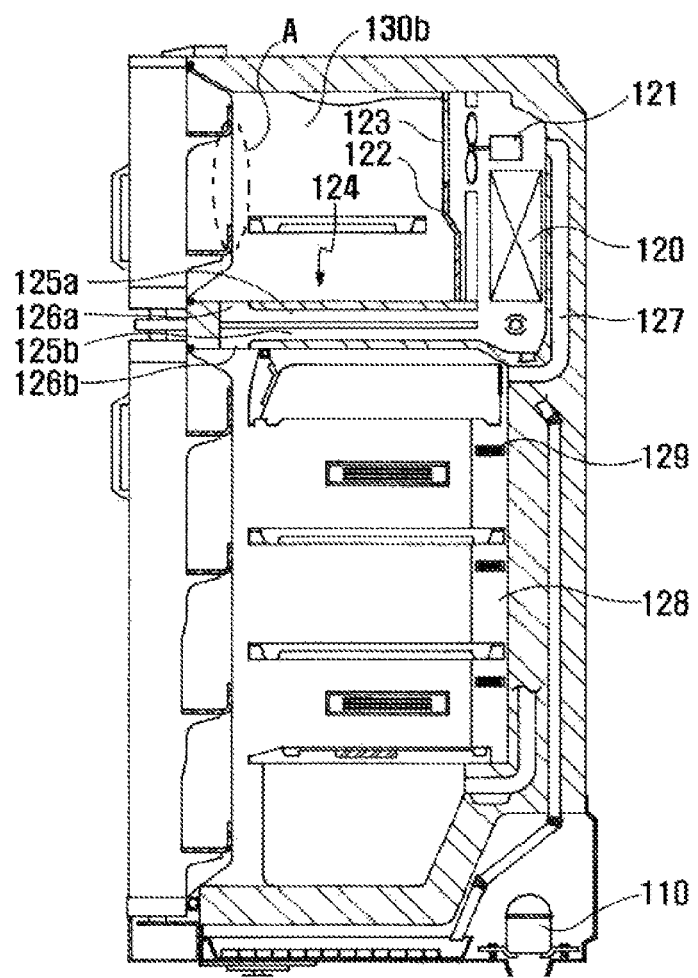
FIG. 1 is a view showing an internal configuration of a refrigerator including an ultraviolet LED according to a first to an eight embodiments.

FIG. 1 is a view showing an internal configuration of a refrigerator including an ultraviolet LED according to a first to an eight embodiments. Referring to FIG. 1, the refrigerator is divided into an upper part and a lower part by a dividing plate 124. A freezer and a fridge are installed in upper part and the lower part respectively. A machine room is installed in the bottom of the back of the fridge. An evaporator 120 is installed in the back of the inside of the freezer. A cool air supply fan 121 supplying cool air to the freezer and fridge is installed over the evaporator 120. The evaporator 120 and the cool air supply fan 121 are isolated by a louver 122 including a cool air outlet port 123 formed in the upper portion thereof. A compressor 110, a condenser and a dryer are installed in the machine room.

Also, a main cool air supply duct 127, which is connected and supplies cool air to the fridge, is formed at the back of the evaporator 120. Return ducts 125a and 125b returning the air within the freezer and the fridge to the evaporator 120 are formed within the dividing plate 124. Cool air inlet ports 126a and 126b introducing the air of the freezer and the fridge to the return ducts 125a and 125b are formed on and beneath the front end of the dividing plate 124.

A base (for example, PCB) having the ultraviolet LED mounted therein is disposed in a portion denoted by "A", i.e., between a first member (not shown) and a second member 130b of the refrigerator, so that light is emitted toward the interior space of the refrigerator. In this manner, harmful substances and bacteria increasing within the refrigerator can be effectively removed. Therefore, it is possible to maintain the sanitary conditions of the food and drink stored within the refrigerator.

The cool air circulation of the refrigerator having the aforementioned structure and the ultraviolet LED will be described as follows. When the cool air supply fan 121 rotates, the cool air supply fan 121 introduces cool air and supplies the cool air to the freezer and the fridge.

Cool air is supplied to the freezer by the cool air supply fan 121 through cool air outlet port 123 of the louver 122. Then, after the freezer temperature is lowered, the cool air is collected to the evaporator 120 through the cool air inlet port 126a formed in the front end of the dividing plate 124 and the return duct 125a.

Cool air is supplied to the fridge through the main cool air supply duct 127 of the evaporator 120 and is supplied to each part of the fridge through a side duct 128 of the fridge and a cool air outlet port 129 formed in a portion of each side duct 128. As such, refrigerant which has cooled the fridge by supplying the cool air is collected to the evaporator 120 through the cool air inlet port 126b of the dividing plate 124 and the return duct 125b. The refrigerant which is collected to the evaporator 120 from the freezer and the fridge contacts with the evaporator 120 and turns into cool air. Then, the cool air is supplied again to the fridge the freezer through the cool air supply fan 121.

The cool air circulation of the refrigerator described above can be summarized as follows. One ends of the return ducts 125a and 125b of the freezer and the fridge include the cool air inlet ports 126a and 126b. The air within the freezer and the fridge, which has passed through the cool air inlet ports 126a and 126b, is returned to the evaporator 120 by the return ducts 125a and 125b. The evaporator 120 cools the air contacted therewith. The cool air supply fan 121 introduces the air cooled by the evaporator 120 through the rotation thereof and delivers the air to the freezer and the fridge through the cool air outlet ports 123 and 129 provided to the freezer and the fridge.

Figure 2:
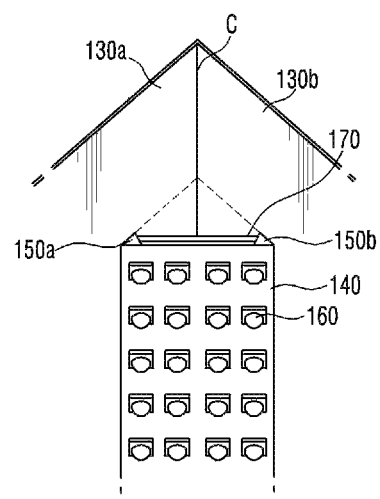
FIG. 2 is a perspective view showing an arrangement of a base contacting with a first wall surface and a second wall surface according to the first embodiment.
Figure 3:
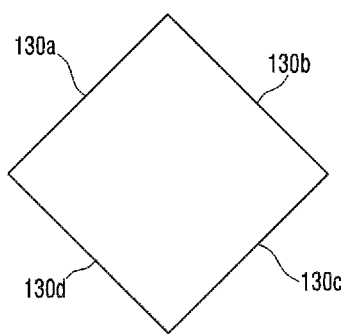
FIG. 3 is a plan view showing arrangements of the first wall surface, the second wall surface, a third wall surface and a fourth wall surface according to the first to the sixth embodiments.

FIG. 2 is a perspective view showing an arrangement of a base contacting with a first wall surface and a second wall surface according to the first embodiment. FIG. 3 is a plan view showing arrangements of the first wall surface, the second wall surface, a third wall surface and a fourth wall surface according to the first to the sixth embodiments. Referring to FIGS. 2 and 3, a refrigerator with an ultraviolet LED may include a first member 130a, a second member 130b, a third member 130c, a fourth member 130d, a base 140, a first fixing member 150a, a second fixing member 150b, an ultraviolet LED 160, a heat sink 170, a reflection cover 180 and a power controller 190.

The internal wall of the refrigerator is constituted by the first member 130a, the second member 130b, the third member 130c and the fourth member 130d. The first member 130a, the second member 130b, the third member 130c and the fourth member 130d are coated with a metallic material having reflectivity. The first member 130a, the second member 130b, the third member 130c and the fourth member 130d may be formed of the same metallic material. Here, the reflectances of the metallic materials of the first member 130a, the second member 130b, the third member 130c and the fourth member 130d are the same to each other, so that light emitted from the ultraviolet LED 160 can be uniformly reflected in the refrigerator. Also, the metallic material of at least one of the first member 130*a*, the second member 130*b*, the third member 130*c* and the fourth member 130*d* may be aluminum. Here, since the reflectance of the aluminum is 90% to 100%, it is possible to maximize reflection effect.

The arrangement of the internal wall of the refrigerator will be described as follows. The direction that one surface of the second member 130*b* faces is perpendicular to the direction that one surface of the first member 130*a* faces. The direction that one surface of the third member 130*c* faces is perpendicular to the direction that one surface of the second member 130*b* faces. The direction that one surface of the fourth member 130*d* faces is perpendicular to the directions that one surfaces of the first member 130*a* and the third member 130*c* face. That is, among the first member 130*a*, the second member 130*b*, the third member 130*c* and the fourth member 130*d*, the first member 130*a* is opposite to the third member 130*c* and the second member 130*b* is opposite to the fourth member 130*d*.

One side and the other side of the base 140 respectively contact with the first member 130*a* and the second member 130*b* which are placed within the refrigerator and have one surfaces having facing directions crossing each other (approximately perpendicularly to each other). The one side and the other side of the base 140 are disposed symmetrically with each other with respect to a reference plane "C" dividing the first member 130*a* and the second member 130*b*.

The first fixing member 150*a* contacts with the first member 130*a* and one side of the base 140, and fixes the base 140 to the first member 130*a*. The second fixing member 150*b* contacts with the other side of the base 140 and the second member 130*b*, and fixes the base 140 to the second member 130*b*. The first fixing member 150*a* and the second fixing member 150*b* are disposed symmetrically with each other with respect to the reference plane "C" dividing the first member 130*a* and the second member 130*b*. The first fixing member 150*a* fixes the base to the first member 130*a* by using a cured adhesive between the bottom surface of the one side of the base 140 and a portion of the first fixing member 150*a* which contacts with the first member 130*a*. The second fixing member 150*b* fixes the base to the second member 130*b* by using the cured adhesive between the bottom surface of the other side of the base 140 and a portion of the second fixing member 150*b* which contacts with the second member 130*b*. Here, epoxy resin may be used as the adhesive. The epoxy resin is a synthetic polymer based adhesive and has a strong adhesive strength.

The ultraviolet LEDs 160 are disposed on the top surface of the base 140 and emit light toward the interior space of the refrigerator. In this manner, the ultraviolet LED 160 is able to directly irradiate light to the first member 130*a*, the second member 130*b*, the third member 130*c* and the fourth member 130*d*. Since the ultraviolet LED 160 is disposed between the first member 130*a* and the second member 130*b*, time required for the light emitted from the ultraviolet LED 160 to reach the first member 130*a* and the second member 130*b* is less than time required for the light to reach the third member 130*c* and the fourth member 130*d*.

The heat sink 170 contacts with the bottom surface of the base 140 and contacts with the first member 130*a* and the second member 130*b*, so that a closed path having a triangular pillar prism is formed. In this manner, the heat sink 170 radiates heat generated from the ultraviolet LED 160 through the surface contact to the closed path formed from the contact of the first member 130*a* with the second member 130*b*. Since the flat-shaped base 140 is disposed between the first member 130*a* and the second member 130*b*, the closed path has a triangular cross section. A heat radiation sheet may be further included between the heat sink 170 and the base 140. The heat sink 170 may be formed of a carbon nano tube (CNT) composite material. The carbon nano tube is a kind of a carbon allotrope consisting of carbons and has a shape of a tube winding in the shape of a cylinder a graphite sheet in which one carbon is combined with another carbon in the form of a hexagonal honeycomb. The carbon nano tube has a diameter of 1 to 100 nm. The carbon nano tube has high thermal property, high electrical conductivity and high strength, so that the carbon nano tube can be used in the heat sink of the ultraviolet LED 160.

The reflection cover 180 reflects the light emitted from the ultraviolet LED 160. The internal structure of the reflection cover 180 will be described in FIG. 4.

The power controller (not shown) may allow the ultraviolet 160 to repeat the following operation. When a first setup time elapses after the ultraviolet 160 becomes in an on-state, the ultraviolet 160 becomes in an off-state. When a second setup time elapses after the ultraviolet 160 becomes in the off-state, the ultraviolet 160 becomes in the on-state. The power controller will be described in detail in FIG. 5.

Figure 4:
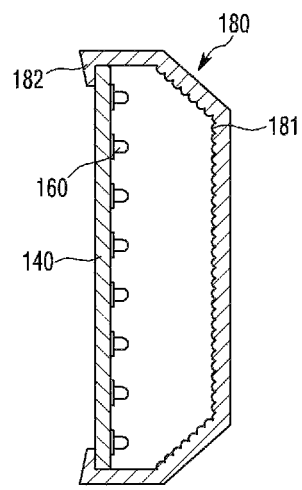
FIG. 4 is a cross sectional view showing a state where a reflection cover is included in the base according to the first embodiment.

FIG. 4 is a cross sectional view showing a state where a reflection cover is included in the base according to the first embodiment. Referring to FIG. 4, a plurality of curved reflective surfaces 181 are formed on the inner surface of the reflection cover 180. The plurality of the curved reflective surfaces 181 are formed at a regular interval. Due to the formation of the curved reflective surface 181, the light emitted from the ultraviolet LED 160 is uniformly reflected in the refrigerator, so that sterilizing effect can be improved and the light emitted from the ultraviolet LED 160 can be more uniformly reflected to each part inside the refrigerator. Also, the plurality of the curved reflective surfaces 181 may be formed at a random interval.

A locking projection 182 caught by the upper and lower portions of the base 140 is formed in one end and the other end of the reflection cover 180. Accordingly, the reflection cover 180 can be more securely fixed to the base 140.

Figure 5:
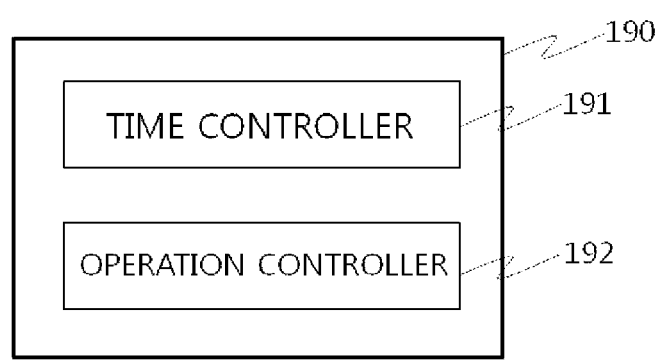
FIG. 5 is a block diagram of a power controller including the ultraviolet LED according to the first embodiment.

FIG. 5 is a block diagram of the power controller including the ultraviolet LED according to the first embodiment. Referring to FIG. 5, the power controller 190 includes a time counter 191 and an operation controller 192. FIG. 5 will be described with reference to FIGS. 2 to 4.

In the operations of the ultraviolet LED 160 of FIGS. 2 to 4, harmful substances and bacteria increasing within the refrigerator can be removed by maintaining the on-state of the ultraviolet LED 160 all the time. Otherwise, the ultraviolet LED 160 may be maintained in the on-state only during a certain period of time for the purpose of the reduction of the electric power and energy conservation In other words, the ultraviolet LED 160 may repeat the operation as follows. When the first setup time elapses after the ultraviolet LED 160 becomes in an on-state, the ultraviolet 160 becomes in an off-state. When a second setup time elapses after the ultraviolet 160 becomes in the off-state, the ultraviolet 160 becomes in the on-state. For example, the ultraviolet LED 160 may repeat the operation as follows. When thirty minutes elapses after the ultraviolet LED 160 becomes in an on-state, the ultraviolet 160 becomes in an off-state. When one hour elapses after the ultraviolet 160 becomes in the off-state, the ultraviolet 160 becomes in the on-state. As described in the control of on-off of the ultraviolet 160, time can be also variously set without being limited to this.

As such, the power controller 190 may be further added to the base 140 so as to control the on-off of the ultraviolet 160. Here, the power controller 190 may be connected to the ultraviolet 160 through the base 140. The power controller 190 includes the time counter 191 and the operation controller 192.

The time counter 191 counts time and judges whether or not the counted time corresponds to a set time. When the counted time does not correspond to the set time, the time counter 191 does not generate an operation control signal. Only when the counted time corresponds to the set time, the time counter 191 generates the operation control signal and transmits to the operation controller 192. That is, when the counted time corresponds to the set time, the time counter 191 continuously generates the operation control signal and transmits to the operation controller 192. When the counted time does not correspond to the set time due to the elapse of time, the operation control signal is not generated by the time counter 191.

When the counted time corresponds to the set time, the operation controller 192 receives the operation control signal from the time counter 191 and operates the ultraviolet 160. That is, when the counted time corresponds to the set time, the operation controller 192 continuously receives the operation control signal from the time counter 191 and operates the ultraviolet 160. When the counted time does not correspond to the set time due to the elapse of time, the operation controller 192 does not receive the operation control signal from the time counter 191 and is not able to operate the ultraviolet 160.

Figure 6:
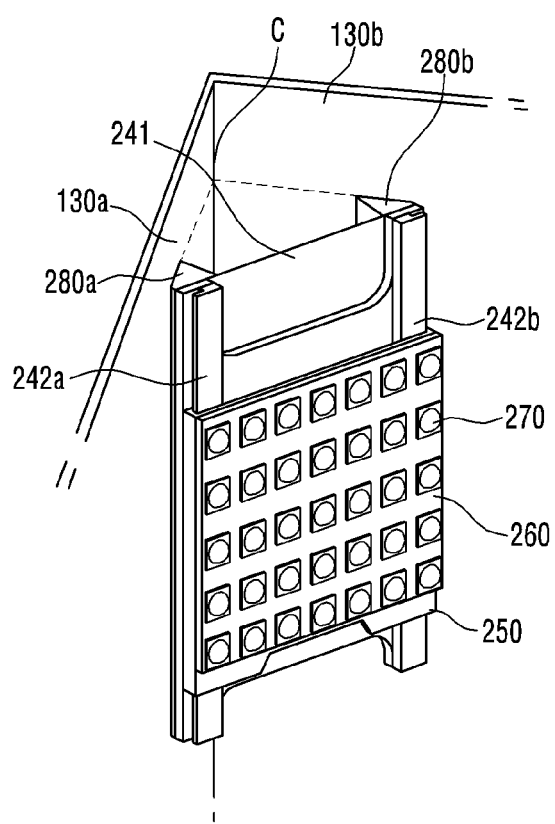
FIG. 6 is a perspective view showing an arrangement of a guide means contacting with the first wall surface and the second wall surface according to a second embodiment.
Figure 7:
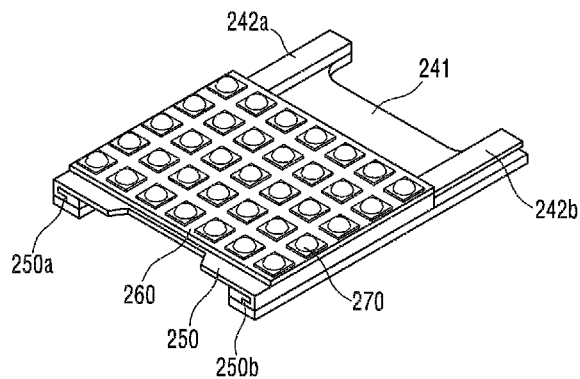
FIG. 7 is a perspective view showing an arrangement of a case where a slide member of FIG. 6 is located at a first position.
Figure 8:
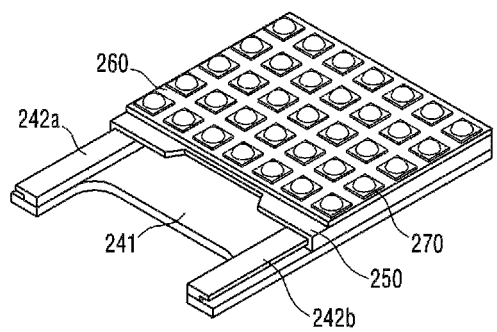
FIG. 8 is a perspective view showing an arrangement of a case where the slide member of FIG. 6 is located at a second position.
Figure 9:
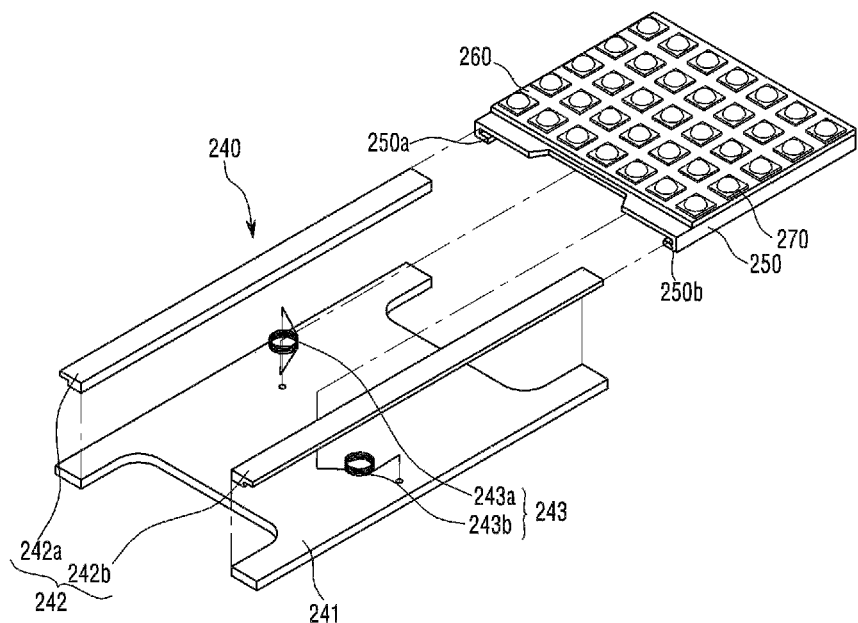
FIG. 9 is an exploded perspective view of FIG. 7 and FIG. 8.
Figure 10:
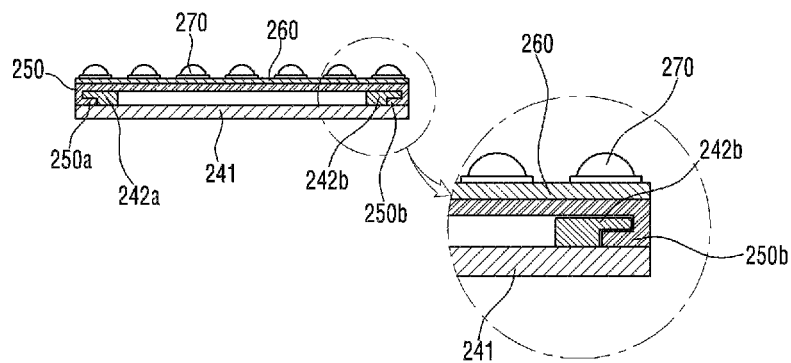
FIG. 10 is a view showing FIG. 7 and FIG. 8 viewed in a sliding direction of the slide member.

FIG. 6 is a perspective view showing an arrangement of a guide means contacting with a first wall surface and a second wall surface according to a second embodiment. FIG. 7 is a perspective view showing an arrangement of a case where a slide member of FIG. 6 is located at a first position. FIG. 8 is a perspective view showing an arrangement of a case where the slide member of FIG. 6 is located at a second position. FIG. 9 is an exploded perspective view of FIG. 7 and FIG. 8. FIG. 10 is a view showing FIG. 7 and FIG. 8 viewed in a sliding direction of the slide member. Referring to FIGS. 3 and 6 to 10, a refrigerator with an ultraviolet LED may include a first member 130a, a second member 130b, a third member 130c, a fourth member 130d, a guide means 240, a slide member 250, a base 260, an ultraviolet LED 270, a first fixing member 280a, a second fixing member 280b and a power controller.

The internal wall of the refrigerator is the same as that described above in FIG. 3.

One side and the other side of the guide means 240 are respectively connected to the first member 130a and the second member 130b which are placed within the refrigerator and have one surfaces having facing directions crossing each other. The guide means 240 includes a guide plate 241, a pair of guide members 242a and 242b which are disposed on the top surface of the guide plate 241 in the longitudinal directions of one sides and the other sides thereof and have guide recesses formed in the outer ends thereof, and a pair of elastic members 243a and 243b which are disposed between the pair of the guide members 242a and 242b and slide the slide member 250 by adding an elastic force. The one side and the other side of the guide means 240 are disposed symmetrically with each other with respect to a reference plane dividing the first member 130a and the second member 130b.

The slide member 250 is formed of a heat radiating material and slides on the top surface of the guide means 240 in the longitudinal direction of the guide means 240. Here, the slide member 250 slides in the longitudinal direction of a tangent line formed by the contact of the first member 130a with the second member 130b. Guide rails 250a and 250b are formed symmetrically with each other in one side and the other side of the slide member 250. The guide rails 250a and 250b are bent in the form of a " ⊂ ". Therefore, the guide rails 250a and 250b are inserted into the guide recesses, and then the slide member 250 slides on the top surface of the guide plate 241 in the longitudinal direction of the guide members 242a and 242b.

The slide member 250 formed in such a structure radiates heat generated from the ultraviolet LED 270 through the surface contact to the outside. Since the slide member 250 is formed of a heat radiating material, the slide member 250 may be formed of a carbon nano tube (CNT) composite material.

The base 260 contacts with the top surface of the slide member 250. A heat radiation sheet may be further included between the base 260 and the slide member 250.

The ultraviolet LED 270 is disposed on the slide member 250 and emits light toward the interior space of the refrigerator. In this manner, the ultraviolet LED 270 is able to directly irradiate light to the first member 130a, the second member 130b, the third member 130c and the fourth member 130d.

Before and after the slide member 250 slides, the ultraviolet LED 270 irradiates light to the first member 130a, the second member 130b, the third member 130c of which one surface faces in a direction perpendicular to the direction that one surface of the second member 130b faces, and the fourth member 130d of which one surface faces in a direction perpendicular to both the direction that one surface of the first member 130a faces and the direction that one surface of the third member 130c faces.

The first fixing member 280a contacts with the first member 130a and the bottom surface of one side of the guide means 240, and fixes the guide means 240 to the first member 130a. The second fixing member 280b contacts with the second member 130b and the bottom surface of the other side of the guide means 240, and fixes the guide means 240 to the second member 130b. The first fixing member 280a and the second fixing member 280b are disposed symmetrically with each other with respect to a reference plane dividing the first member 130a and the second member 130b. The first fixing member 280a fixes the guide means 240 to the first member 130a by using a cured adhesive between the bottom surface of the one side of the guide means 240 and a portion of the first fixing member 280a which contacts with the first member 130a. The second fixing member 280b fixes the guide means 240 to the second member 130b by using the cured adhesive between the bottom surface of the other side of the guide means 240 and a portion of the second fixing member 280b which contacts with the second member 130b. Here, epoxy resin may be used as the adhesive.

The power controller (not shown) may allow the ultraviolet 270 to repeat the following operation. When a first setup time elapses after the ultraviolet 270 becomes in an on-state, the ultraviolet 270 becomes in an off-state. When a second setup time elapses after the ultraviolet 270 becomes in the off-state, the ultraviolet 270 becomes in the on-state. The power controller will be described in detail in FIG. 5.

Figure 11:
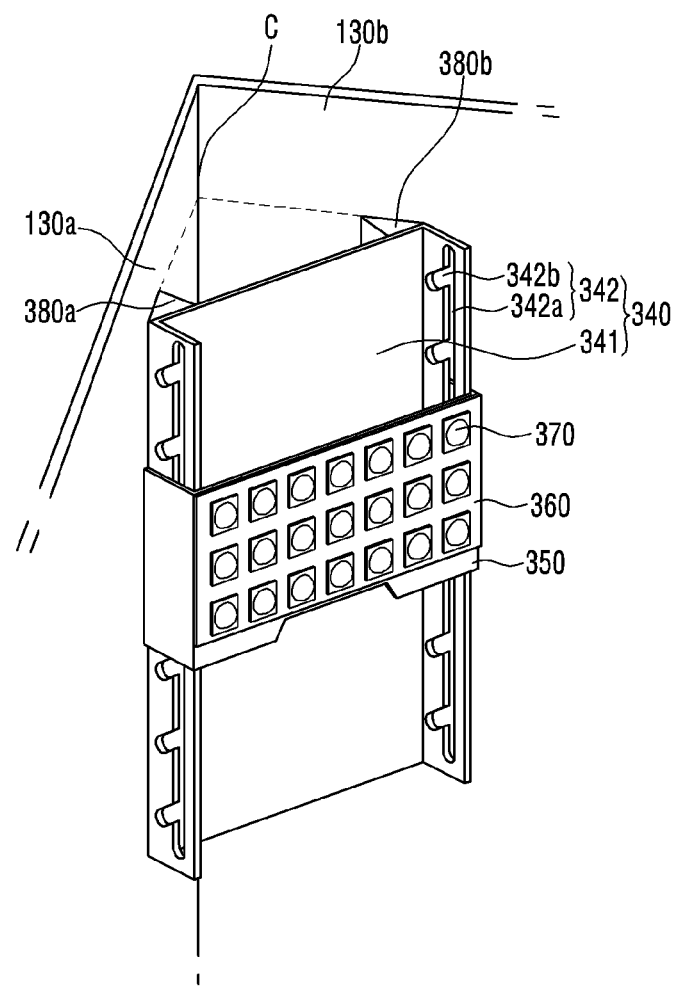
FIG. 11 is a perspective view showing an arrangement of a guide means contacting with a first wall surface and a second wall surface according to a third embodiment.
Figure 12:
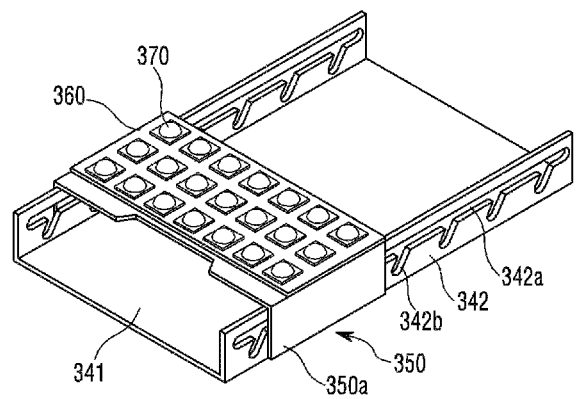
FIG. 12 is a perspective view showing an arrangement where a moving member of FIG. 11 is located at a first position.
Figure 13:
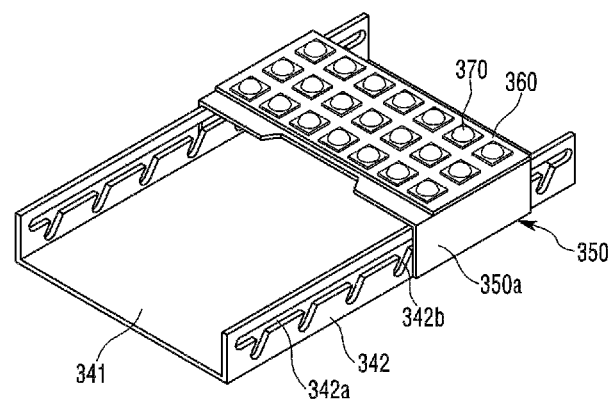
FIG. 13 is a perspective view showing an arrangement where a moving member of FIG. 11 is located at a second position.
Figure 14:
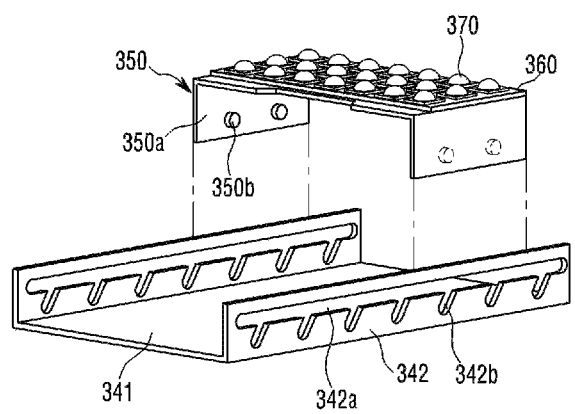
FIG. 14 is an exploded perspective view of FIG. 12 and FIG. 13.
Figure 15:
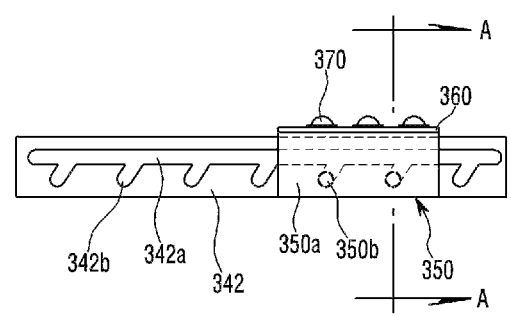
FIG. 15 is a view showing one side of the guide member of FIG. 12 viewed from the outside.
Figure 16:
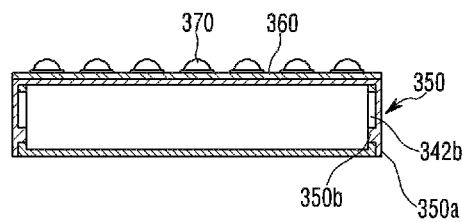
FIG. 16 is a view showing FIG. 15 viewed in a moving direction of the moving member.

FIG. 11 is a perspective view showing an arrangement of a guide means contacting with a first wall surface and a second wall surface according to a third embodiment. FIG. 12 is a perspective view showing an arrangement where a moving member of FIG. 11 is located at a first position. FIG. 13 is a perspective view showing an arrangement where a moving member of FIG. 11 is located at a second position. FIG. 14 is an exploded perspective view of FIG. 12 and FIG. 13. FIG. 15 is a view showing one side of the guide member of FIG. 12 viewed from the outside. FIG. 16 is a view showing FIG. 15 viewed in a moving direction of the moving member. Referring to FIGS. 3 and 11 to 16, a refrigerator with an ultraviolet LED may include a first member 130a, a second member 130b, a third member 130c, a fourth member 130d, a guide means 340, a moving member 350, a base 360, an ultraviolet LED 370, a first fixing member 380a, a second fixing member 380b and a power controller.

The internal wall of the refrigerator is the same as that described above in FIG. 3.

One side and the other side of the guide means 340 are respectively connected to the first member 130a and the second member 130b which are placed within the refrigerator and have one surfaces having facing directions crossing each other. The guide means 340 includes a guide plate 341 and a pair of guide members 342. The pair of guide members 342 are disposed on the guide plate 341 in the longitudinal directions of one sides and the other sides thereof and include guide recesses 342a formed therein and a plurality of locking recesses 342b which extend from the guide recesses 342a in such a manner as to allow the moving member 350 to move step by step. The one side and the other side of the guide means 340 are disposed symmetrically with each other with respect to a reference plane dividing the first member 130a and the second member 130b.

The moving member 350 is formed of a heat radiating material and is movable step by step on the guide means 340 in the longitudinal direction of the guide means 340. Here, the moving member 350 moves in the longitudinal direction of a tangent line formed by the contact of the first member 130a with the second member 130b. The moving member 350 includes bent portions 350a and a projection 350b including a plurality of protrusions formed on the inner surface of the bent portion 350a such that the moving member 350 is caught by the locking recesses 342b. The bent portions 350a are formed symmetrically with each other in one side and the other side of the moving member 350. The bent portions 350a are bent in the form of in the form of a "⌐". That is, it can be easily understood that FIG. 16 is a cross sectional view taken along an alternated long and short dash line AA of FIG. 15. The bent portions 350a are formed symmetrically with each other. The projections 350b are formed symmetrically with each other. Each protrusion of the projection 350b is caught by one among the plurality of the locking recesses 342b. Here, the plurality of the protrusions are formed at the same interval as that of the locking recesses 342b, so that the moving member 350 is able to move movable step by step.

The moving member 350 formed in such a structure radiates heat generated from the ultraviolet LED 370 through the surface contact to the outside. Since the moving member 350 is formed of a heat radiating material, the moving member 350 may be formed of a carbon nano tube (CNT) composite material.

The base 360 contacts with the top surface of the moving member 350. A heat radiation sheet may be further included between the base 360 and the moving member 350.

The ultraviolet LED 370 is disposed on the top surface of the moving member 350 and emits light toward the interior space of the refrigerator. In this manner, the ultraviolet LED 370 is able to directly irradiate light to the first member 130a, the second member 130b, the third member 130c and the fourth member 130d.

Before and after the moving member 350 moves, the ultraviolet LED 370 irradiates light to the first member 130a, the second member 130b, the third member 130c of which one surface faces in a direction perpendicular to the direction that one surface of the second member 130b faces, and the fourth member 130d of which one surface faces in a direction perpendicular to both the direction that one surface of the first member 130a faces and the direction that one surface of the third member 130c faces.

The first fixing member 380a contacts with the first member 130a and the bottom surface of one side of the guide means 340, and fixes the guide means 340 to the first member 130a. The second fixing member 380b contacts with the second member 130b and the bottom surface of the other side of the guide means 340, and fixes the guide means 340 to the second member 130b. The first fixing member 380a and the second fixing member 380b are disposed symmetrically with each other with respect to a reference plane dividing the first member 130a and the second member 130b. The first fixing member 380a fixes the guide means 340 to the first member 130a by using a cured adhesive between the bottom surface of the one side of the guide means 340 and a portion of the first fixing member 380a which contacts with the first member 130a. The second fixing member 380b fixes the guide means 340 to the second member 130b by using the cured adhesive between the bottom surface of the other side of the guide means 340 and a portion of the second fixing member 380b which contacts with the second member 130b. Here, epoxy resin may be used as the adhesive.

The power controller (not shown) may allow the ultraviolet 370 to repeat the following operation. When a first setup time elapses after the ultraviolet 370 becomes in an on-state, the ultraviolet 370 becomes in an off-state. When a second setup time elapses after the ultraviolet 370 becomes in the off-state, the ultraviolet 370 becomes in the on-state. The power controller will be described in detail in FIG. 5.

Figure 17:
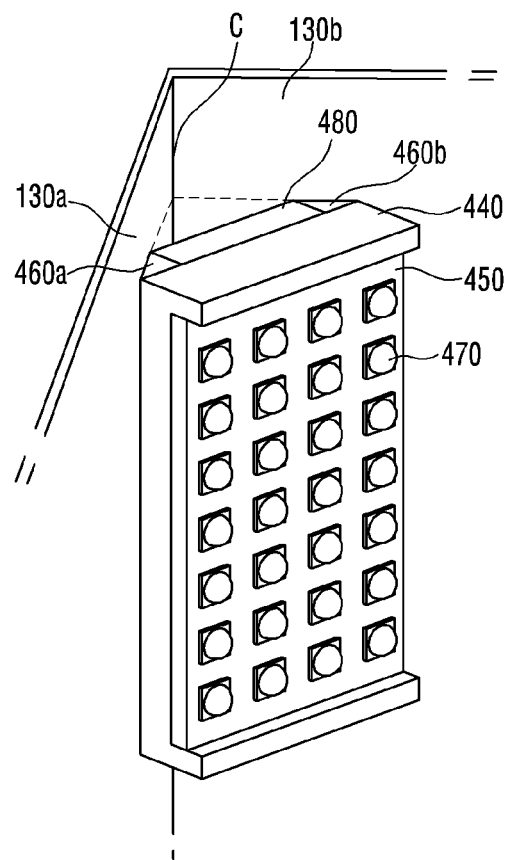
FIG. 17 is a perspective view showing an arrangement of a frame contacting with a first wall surface and a second wall surface according to a fourth embodiment.
Figure 18:
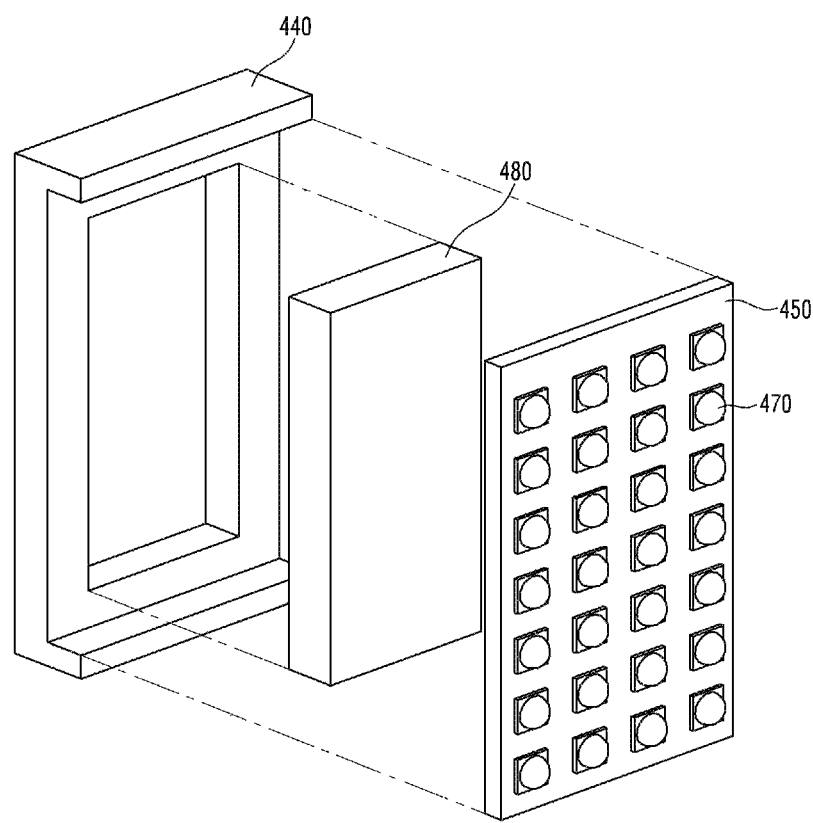
FIG. 18 is an exploded perspective view showing a state where a base according to the fourth embodiment has been separated from the frame.

FIG. 17 is a perspective view showing an arrangement of a frame contacting with a first wall surface and a second wall surface according to a fourth embodiment. FIG. 18 is an exploded perspective view showing a state where a base according to the fourth embodiment has been separated from the frame. Referring to FIGS. 3 and 17 to 18, a refrigerator with an ultraviolet LED may include a first member 130a, a second member 130b, a third member 130c, a fourth member 130d, a frame 440, a base 450, a first fixing member 460a, a second fixing member 460b, an ultraviolet LED 470, a heat sink 480 and a power controller.

The internal wall of the refrigerator is the same as that described above in FIG. 3.

One side and the other side of the frame 440 respectively contact with the first member 130a and the second member 130b which are disposed adjacent to each other within the refrigerator. The frame 440 is a "⊏"-shaped three-dimensional structure as viewed from a side thereof. The one side and the other side of the frame 440 are disposed symmetrically with each other with respect to a reference plane dividing the first member 130a and the second member 130b. The upper portion of the frame 440 includes a coupling recess having almost the same length as the longitudinal length of the base 440 in such a manner that the base 450 is inserted and fixed to the frame 440. The lower portion of the frame 440 includes a hole formed therein to which the heat sink 480 is inserted and fixed. The hole is formed to have a quadrangular shape for the quadrangular heat sink 480 to be inserted and fitted.

The base 450 is coupled to and separated from the frame 440. That is, the base 440 may be inserted and fixed to the coupling recess of the frame 440 and may be separated from the coupling recess. Since the base 450 is coupled to and separated from the frame 440, the base 450 with the ultraviolet LED 470 can be easily replaced, maintained and repaired.

The first fixing member 460a contacts with the first member 130a and one side of the frame 440, and fixes the frame 440 to the first member 130a. The second fixing member 460b contacts with the other side of the frame 440 and the second member 130b, and fixes the frame 440 to the second member 130b. The first fixing member 460a and the second fixing member 460b are disposed symmetrically with each other with respect to the reference plane "C" dividing the first member 130a and the second member 130b. The first fixing member 460a fixes the frame 440 to the first member 130a by using a cured adhesive between the bottom surface of the one side of the frame 440 and a portion of the first fixing member 480a which contacts with the first member 130a. The second fixing member 460b fixes the frame 440 to the second member 130b by using the cured adhesive between the bottom surface of the other side of the frame 440 and a portion of the second fixing member 460b which contacts with the second member 130b. Here, epoxy resin may be used as the adhesive.

The ultraviolet LED 470 is disposed on the top surface of the base 450 and emits light toward the interior space of the refrigerator. In this manner, the ultraviolet LED 470 is able to directly irradiate light to the first member 130a, the second member 130b, the third member 130c and the fourth member 130d.

The heat sink 480 contacts with the bottom surface of the base 450 and contacts with the first member 130a and the second member 130b, so that a closed path having a triangular pillar prism is formed. In this manner, the heat sink 480 radiates heat generated from the ultraviolet LED 470 through the surface contact to the closed path formed from the contact of the first member 130a with the second member 130b. Since the flat-shaped base 450 is disposed between the first member 130a and the second member 130b, the closed path has a triangular cross section. A heat radiation sheet may be further included between the heat sink 480 and the base 450. The heat sink 480 may be formed of a carbon nano tube (CNT) composite material.

The power controller (not shown) may allow the ultraviolet LED 470 to repeat the following operation. When a first setup time elapses after the ultraviolet LED 470 becomes in an on-state, the ultraviolet LED 470 becomes in an off-state. When a second setup time elapses after the ultraviolet LED 470 becomes in the off-state, the ultraviolet LED 470 becomes in the on-state. The power controller will be described in detail in FIG. 5.

Figure 19:
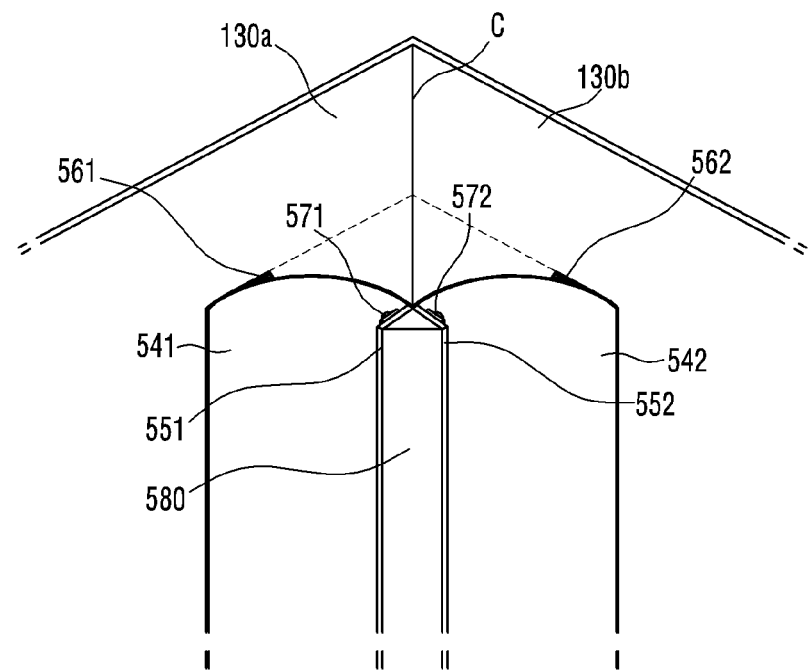
FIG. 19 is a perspective view showing an arrangement of a reflector contacting with a first wall surface and a second wall surface according to a fifth embodiment.
Figure 20:
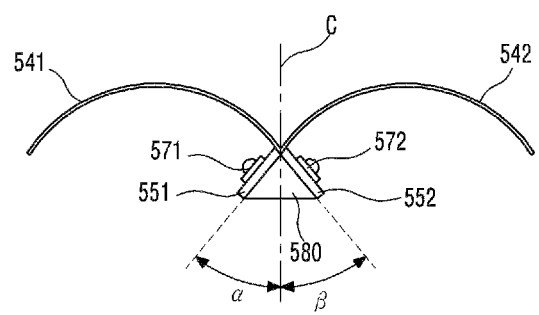
FIG. 20 is a plan view showing a state where the base of FIG. 19 has been disposed.
Figure 21:
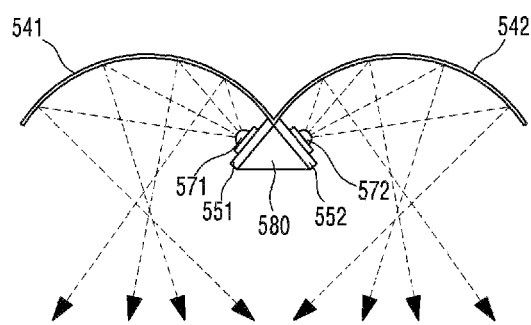
FIG. 21 is a plan view showing how light generated from the ultraviolet LED of FIG. 19 is emitted.

FIG. 17 is a perspective view showing an arrangement of a reflector contacting with a first wall surface and a second wall surface according to a fifth embodiment. FIG. 20 is a plan view showing a state where the base of FIG. 19 has been disposed. FIG. 21 is a plan view showing how light generated from the ultraviolet LED of FIG. 19 is emitted. Referring to FIGS. 3 and 19 to 21, a refrigerator with an ultraviolet LED may include a first member 130a, a second member 130b, a third member 130c, a fourth member 130d, a first reflector 541, a second reflector 542, a first base 551, a second base 552, a first fixing member 561, a second fixing member 562, a first ultraviolet LED 571, a second ultraviolet LED 572, a heat sink 580 and a power controller (not shown).

The internal wall of the refrigerator is the same as that described above in FIG. 3.

The first reflector 541 is disposed between the first member 130a and the second member 130b which are placed within the refrigerator and have one surfaces having facing directions crossing each other. The first reflector 541 has a curved surface. The second reflector 542 extends from one end of the first reflector 541 and is disposed symmetrically with the first reflector 541. Therefore, the first reflector 541 and the second reflector 542 have the same curvature. The reflective surfaces of the first reflector 541 and the second reflector 542 may be coated with aluminum. When the reflective surfaces are coated with aluminum, the reflectance of the reflectors can be maximized to 90% to 100%.

The first base 551 and the second base 552 are disposed in the extension directions of the first reflector 541 and the second reflector 542. As shown in FIG. 20, the first base 551 and the second base 552 are respectively formed obliquely in the curved directions of the first reflector 541 and the second reflector 542 at acute angles ($\alpha$ and $\beta$) with respect to a reference plane "C" (denoted by an alternated long and short dash line) dividing the first reflector 541 and the second reflector 542. Here, the first base 551 and the second base 552 are disposed symmetrically with each other with respect to a reference plane dividing the first member 130a and the second member 130b.

The first reflector 541, the second reflector 542, the first base 551 and the second base 552 may be formed of the same material. The first reflector 541, the second reflector 542, the first base 551 and the second base 552 may be integrally formed with each other. When the first reflector 541, the second reflector 542, the first base 551 and the second base 552 are integrally formed with each other, they come to occupy a smaller interior space of the refrigerator, so that there is no necessity of a refrigerator larger than necessary. The first base 551 and the second base 552 may be attachable to and removable from the first reflector 541 and the second reflector 542.

When the first base 551 and the second base 552 may be attachable to and removable from the first reflector 541 and the second reflector 542, it is easy to repair and check the first base 551 and the second base 552.

The first fixing member 561 contacts with the first member 130a and one side of the first reflector 541, and fixes the first reflector 541 to the first member 130a. The second fixing member 562 contacts with the second member 130b and the other side of the second reflector 542, and fixes the second reflector 542 to the second member 130b. The first fixing member 561 and the second fixing member 562 are disposed symmetrically with each other with respect to the reference plane "C" dividing the first member 130a and the second member 130b. The first fixing member 561 fixes the first reflector 541 to the first member 130a by using a cured adhesive between the bottom surface of the one side of the first reflector 541 and a portion of the first fixing member 561 which contacts with the first member 130a. The second fixing member 562 fixes the second reflector 542 to the second member 130b by using the cured adhesive between the bottom surface of the other side of the second reflector 542 and a portion of the second fixing member 562 which contacts with the second member 130b. Here, epoxy resin may be used as the adhesive.

The first ultraviolet LED 571 and the second ultraviolet LED 572 have the same or similar numbers and are disposed symmetrically with each other on the first base 551 and the second base 552 in the longitudinal directions of the first base 551 and the second base 552, so that light is emitted toward the interior space of the refrigerator. Specifically, the first ultraviolet LED 571 and the second ultraviolet LED 572 are disposed on the first base 551 and the second base 552 like PCB. Here, the first ultraviolet LED 571 and the second ultraviolet LED 572 irradiate light to the first member 130*a*, the second member 130*b*, the third member 130*c* and the fourth member 130*d*.

The heat sink 580 contacts commonly with the bottom surfaces of the first base 551 and the second base 552 and radiates heat generated from the first ultraviolet LED 571 and the second ultraviolet LED 572. A heat radiation sheet may be further included between the first base 551 and the heat sink 580 and between the second base 552 and the heat sink 580. The heat sink 580 may be formed of a carbon nano tube (CNT) composite material.

The power controller (not shown) may allow the first ultraviolet LED 571 and the second ultraviolet LED 572 to repeat the following operation. When a first setup time elapses after the first ultraviolet LED 571 and the second ultraviolet LED 572 become in an on-state, the first ultraviolet LED 571 and the second ultraviolet LED 572 become in an off-state. When a second setup time elapses after the first ultraviolet LED 571 and the second ultraviolet LED 572 become in the off-state, the first ultraviolet LED 571 and the second ultraviolet LED 572 become in the on-state.

Figure 22:
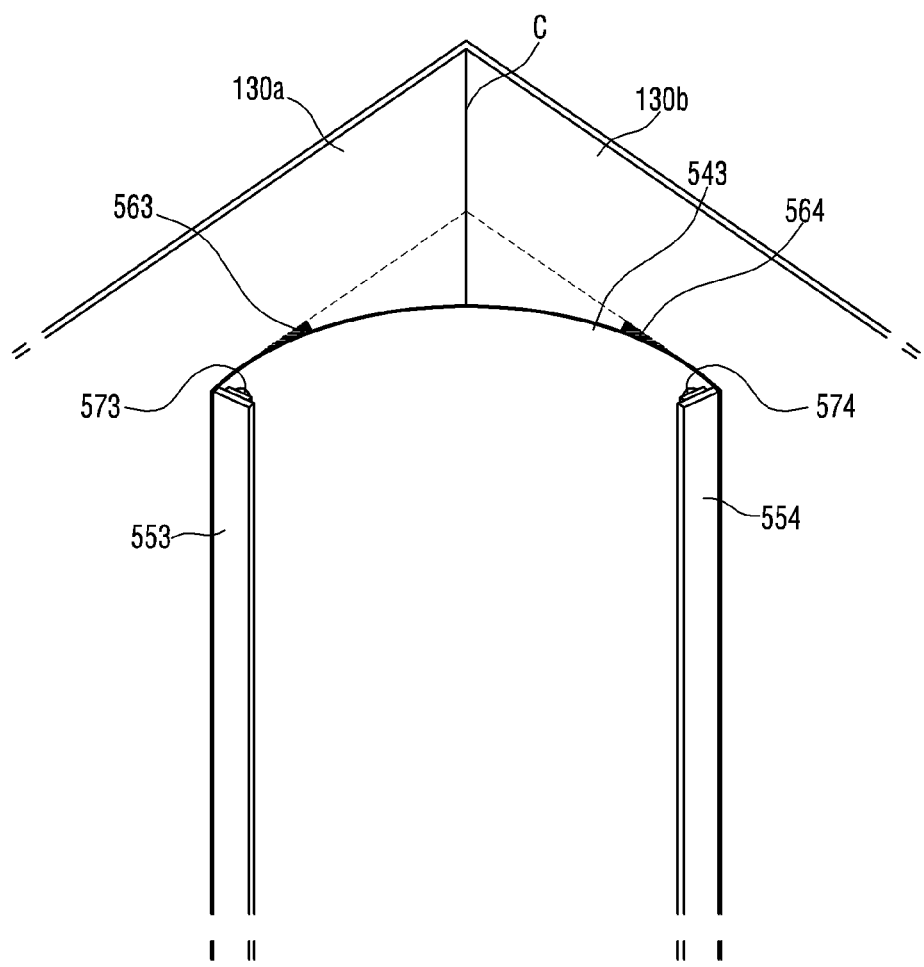
FIG. 22 is a perspective view showing an arrangement of a reflector contacting with a first wall surface and a second wall surface according to a sixth embodiment.
Figure 23:
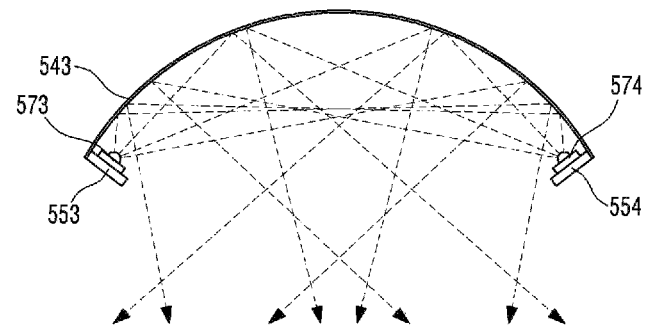
FIG. 23 is a plan view showing how light generated from the ultraviolet LED of FIG. 22 is emitted.

FIG. 22 is a perspective view showing an arrangement of a reflector contacting with a first wall surface and a second wall surface according to a sixth embodiment. FIG. 23 is a plan view showing how light generated from the ultraviolet LED of FIG. 22 is emitted. Referring to FIGS. 3 and 22 to 23, a refrigerator an the ultraviolet LED may include a first member 130*a*, a second member 130*b*, a third member 130*c*, a fourth member 130*d*, a reflector 543, a first base 553, a second base 554, a first fixing member 563, a second fixing member 564, a first ultraviolet LED 573, a second ultraviolet LED 574, a first heat sink (not shown), a second heat sink (not shown) and a power controller (not shown).

The internal wall of the refrigerator is the same as that described above in FIG. 3.

The first reflector 543 is disposed between the first member 130*a* and the second member 130*b* which are placed within the refrigerator and have one surfaces having facing directions crossing each other. The first reflector 543 has a curved surface. The reflective surface of the reflector 543 may be coated with aluminum. When the reflective surfaces are coated with aluminum, the reflectance of the reflectors can be maximized to 90% to 100%.

The first base 553 and the second base 554 are disposed in the extension directions of one end and the other end of the reflector 543 and are formed obliquely toward the curved inner surface of the reflector 543. Here, the first base 553 and the second base 554 are disposed symmetrically with each other with respect to a reference plane "C" dividing the first member 130*a* and the second member 130*b*.

The reflector 543, the first base 553 and the second base 554 may be formed of the same material. The reflector 543, the first base 553 and the second base 554 may be integrally formed with each other. When the reflector 543, the first base 553 and the second base 554 are integrally formed with each other, they come to occupy a smaller interior space of the refrigerator, so that there is no necessity of a refrigerator larger than necessary. The first base 553 and the second base 554 may be attachable to and removable from the reflector 543. When the first base 553 and the second base 554 are attachable to and removable from the reflector 543, it is easy to repair and check the first base 553 and the second base 554.

The first fixing member 563 contacts with the first member 130*a* and the curved surface of one side of the reflector 543, and fixes the curved surface of the one side of the reflector 543 to the first member 130*a*. The second fixing member 564 contacts with the second member 130*b* and the curved surface of the other side of the reflector 543, and fixes the curved surface of the other side of the reflector 543 to the second member 130*b*. The first fixing member 563 and the second fixing member 564 are disposed symmetrically with each other with respect to the reference plane "C" dividing the first member 130*a* and the second member 130*b*. The first fixing member 563 fixes the one side of the reflector 543 to the first member 130*a* by using a cured adhesive between the bottom surface the one side of the reflector 543 and a portion of the first fixing member 563 which contacts with the first member 130*a*. The second fixing member 564 fixes the other side of the reflector 543 to the second member 130*b* by using a cured adhesive between the bottom surface the other side of the reflector 543 and a portion of the second fixing member 564 which contacts with the second member 130*b*. Here, epoxy resin may be used as the adhesive.

The first ultraviolet LED 573 and the second ultraviolet LED 574 have the same or similar numbers and are disposed symmetrically with each other on the first base 553 and the second base 554 in the longitudinal directions of the first base 553 and the second base 554, so that light is emitted toward the interior space of the refrigerator. Specifically, the first ultraviolet LED 573 and the second ultraviolet LED 574 are respectively disposed on the top surfaces of the first base 553 and the second base 554 like PCB. Here, the first ultraviolet LED 573 and the second ultraviolet LED 574 irradiate light to the first member 130*a*, the second member 130*b*, the third member 130*c* and the fourth member 130*d*.

The first heat sink and the second heat sink contact with the bottom surfaces of the first base 553 and the second base 554 respectively, and radiate heat generated from the first ultraviolet LED 573 and the second ultraviolet LED 574. A heat radiation sheet may be further included between the first base 553 and the first heat sink and between the second base 554 and the second heat sink. The first and the second heat sinks may be formed of a carbon nano tube (CNT) composite material.

The power controller (not shown) may allow the first ultraviolet LED 573 and the second ultraviolet LED 574 to repeat the following operation. When a first setup time elapses after the first ultraviolet LED 573 and the second ultraviolet LED 574 become in an on-state, the first ultraviolet LED 573 and the second ultraviolet LED 574 become in an off-state. When a second setup time elapses after the first ultraviolet LED 573 and the second ultraviolet LED 574 become in the off-state, the first ultraviolet LED 573 and the second ultraviolet LED 574 become in the on-state. The power controller will be described in detail in FIG. 5.

Figure 24:
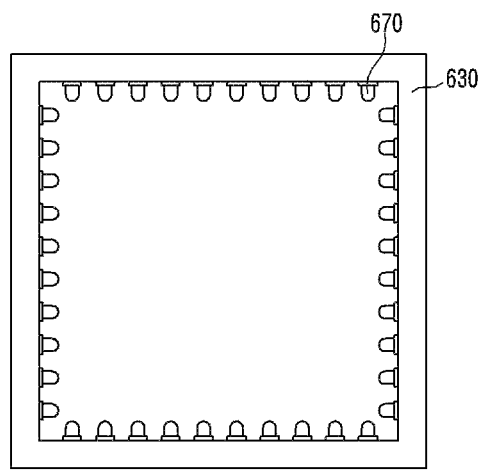
FIG. 24 is a schematic view showing a state where the ultraviolet LED is disposed in a quadrangular frame included in a cool air inlet port or a cool air outlet port according to a seventh embodiment.

FIG. 24 is a schematic view showing a state where an ultraviolet LED is disposed in a quadrangular frame included in a cool air inlet port or a cool air outlet port according to a seventh embodiment. Referring to FIGS. 1 and 24, the circumferences of the cool air inlet ports 126*a* and 126*b* and the circumferences of the cool air outlet ports 123 and 129 include a frame 630 including an inner empty space. An ultraviolet LED 670 faces toward the center of the frame 630 and is disposed on the inner surface of the frame 630. The frame 630 has a quadrangular shape. The ultraviolet LEDs 670 are arranged in a regular form on four sides toward the center of the frame 630. Here, the ultraviolet LEDs 670 are arranged apart from each other at a regular interval on each of the four sides toward the center of the frame 630, so that light emitted from the ultraviolet LEDs 670 can be uniformly irradiated to each part of the inner space of the frame 630.

While the frame 630 has a quadrangular shape in the present invention, the frame 630 may have various shapes without being limited to the quadrangular shape.

Figure 25:
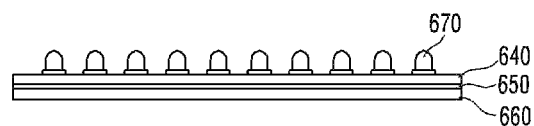
FIG. 25 is a front view showing an arrangement of a case where a heat sink is included in a base according to the seventh embodiment.

FIG. 25 is a front view showing an arrangement of a case where a heat sink is included in a base according to the seventh embodiment. Referring to FIG. 25, a base 640 is disposed on the bottom surface of the ultraviolet LED 670. A heat sink 660 radiating heat generated from the ultraviolet LED 670 is provided under the base 640. A heat radiation sheet 650 may be further provided between the heat sink 660 and the base 640.

The heat sink 660 may be formed of a carbon nano tube (CNT) composite material.

The power controller (not shown) may allow the ultraviolet LED 670 to repeat the following operation. When a first setup time elapses after the ultraviolet LED 670 becomes in an on-state, the ultraviolet LED 470 becomes in an off-state. When a second setup time elapses after the ultraviolet LED 670 becomes in the off-state, the ultraviolet LED 670 becomes in the on-state. The power controller will be described in detail in FIG. 5.

Figure 26:
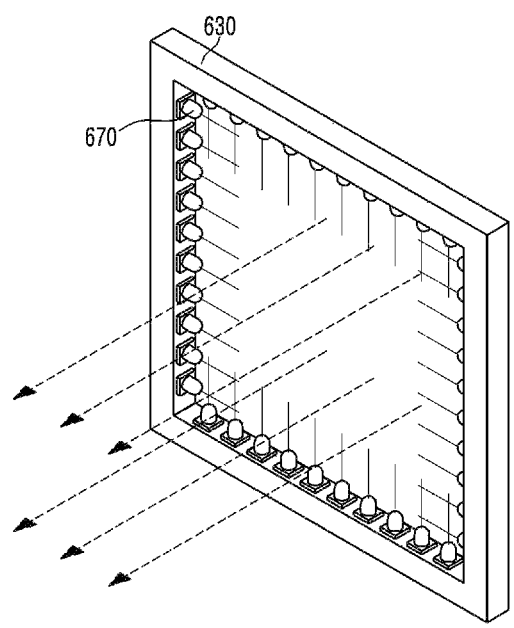
FIG. 26 is a perspective view showing that the ultraviolet LED irradiates light to air passing through the quadrangular frame included in the cool air inlet port or the cool air outlet port according to the seventh embodiment.

FIG. 26 is a perspective view showing that the ultraviolet LED irradiates light to air passing through the quadrangular frame included in the cool air inlet port or the cool air outlet port according to the seventh embodiment. Referring to FIGS. 24 to 26, the ultraviolet LED 670 surrounds air passing through the frame included in the cool air inlet port 126a and 126b or the cool air outlet port 123 and 129 and irradiates light to the air perpendicular to the traveling direction of the air.

In this manner, the light irradiated from the ultraviolet LED 670 is irradiated to the air passing through the cool air inlet ports 126a and 126b or the cool air outlet ports 123 and 129, so that effect of sterilizing the air within the refrigerator can be enhanced.

Figure 27:
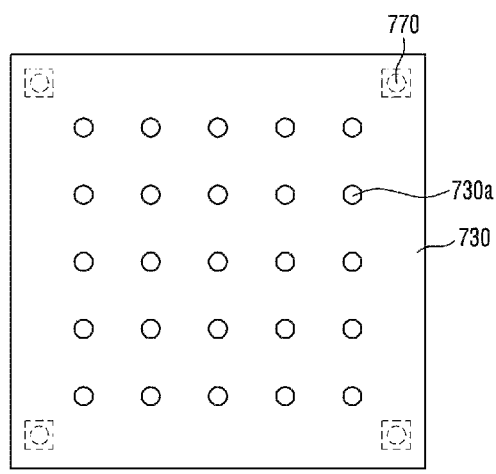
FIG. 27 is a schematic view showing a state where the ultraviolet LED is disposed in a quadrangular light guide plate included in a cool air inlet port or a cool air outlet port according to a eighth embodiment.

FIG. 27 is a schematic view showing a state where an ultraviolet LED is disposed in a quadrangular light guide plate included in a cool air inlet port or a cool air outlet port according to a eighth embodiment. Referring to FIG. 27, a light guide plate 730 including a plurality of holes is provided to the cool air inlet ports 126a and 126b and the cool air outlet ports 123 and 129. An ultraviolet LED 770 is disposed on the light guide plate 730 in the formation direction of the hole 730a in the cool air inlet ports 126a and 126b and the cool air outlet ports 123 and 129. The light guide plate 730 has a quadrangular shape and the ultraviolet LEDs 770 are arranged in the corners of the light guide plate 730. Here, the holes are formed in the light guide plate 730 at a regular interval, so that light emitted from the ultraviolet LED 770 can be uniformly irradiated to the air passing through the holes 730a formed in the light guide plate 730. The holes may be also formed in the light guide plate 730 at a random interval.

While the light guide plate 730 has a quadrangular shape in the present invention, the light guide plate 730 may have various shapes without being limited to the quadrangular shape.

Figure 28:
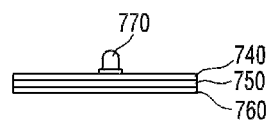
FIG. 28 is a front view showing an arrangement of a case where a heat sink is included in a base according to the eighth embodiment.

FIG. 28 is a front view showing an arrangement of a case where a heat sink is included in a base according to the eighth embodiment. Referring to FIG. 28, a base 740 is disposed on the bottom surface of the ultraviolet LED 770. A heat sink 760 radiating heat generated from the ultraviolet LED 770 is provided under the base 740. A heat radiation sheet 750 may be further provided between the heat sink 660 and the base 740.

The heat sink 760 may be formed of a carbon nano tube (CNT) composite material. The power controller (not shown) may allow the ultraviolet LED 770 to repeat the following operation. When a first setup time elapses after the ultraviolet LED 770 becomes in an on-state, the ultraviolet LED 770 becomes in an off-state. When a second setup time elapses after the ultraviolet LED 770 becomes in the off-state, the ultraviolet LED 770 becomes in the on-state. The power controller will be described in detail in FIG. 5.

Figure 29:
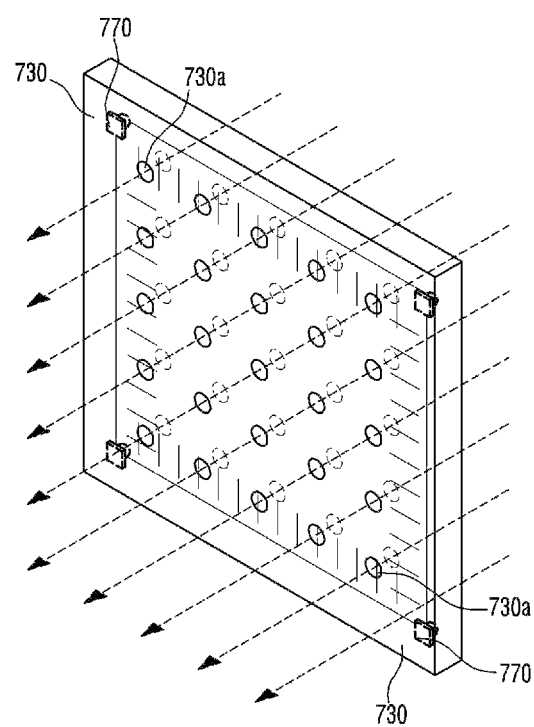
FIG. 29 is a perspective view showing that the ultraviolet LED irradiates light to air passing through a quadrangular light guide plate included in the cool air inlet port or the cool air outlet port according to the eighth embodiment.

FIG. 29 is a perspective view showing that the ultraviolet LED irradiates light to air passing through a quadrangular light guide plate included in the cool air inlet port or the cool air outlet port according to the eighth embodiment. Referring to FIGS. 27 to 29, the light guide plate 730 passes air introduced by a cool air supply fan through the plurality of the holes 730a. Here, the ultraviolet LED 770 generates and irradiates light to the air, which passes through the light guide plate 730, perpendicular to the formation direction of the hole 730 in the cool air inlet ports 126a and 126b and the cool air outlet ports 123 and 129.

In this manner, the light irradiated from the ultraviolet LED 770 is irradiated to the air passing through the cool air inlet ports 126a and 126b or the cool air outlet ports 123 and 129, so that effect of sterilizing the air within the refrigerator can be enhanced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator with ultraviolet LEDs, the refrigerator comprising:
   a door;
   an internal wall which defines an interior space of the refrigerator, the internal wall comprising:
     a first wall; and
     a second wall coupled to the first wall;
   a reflector disposed between the first wall and the second wall, and comprising an inner curved surface and an outer surface disposed on the first wall and the second wall;

a first base coupled to a first end of the reflector and having a predetermined angle with respect to the first end of the reflector;

a second base coupled to a second end of the reflector and having a predetermined angle on the basis of the second end of the reflector;

a first ultraviolet LED being disposed on the first base, and configured to emit ultraviolet lights to the inner curved surface of the reflector; and a second ultraviolet LED being disposed on the second base, and configured to emit ultraviolet lights to the inner curved surface of the reflector, wherein the first end of the reflector is coupled to the first wall, and wherein the second end of the reflector is coupled to the second wall.

2. The refrigerator of claim 1, wherein the outer surface of the reflector comprises an outer surface first end coupled to the first wall and an outer surface second end coupled to the second wall.

3. The refrigerator of claim 2, wherein the outer surface of the reflector is curved, and wherein the refrigerator further comprises:

a first fixing member disposed between the first wall and the outer surface first end; and a second fixing member disposed between the second wall and the outer surface second end.

4. The refrigerator of claim 3, wherein the first wall, the second wall and the reflector form a space.

5. The refrigerator of claim 1, wherein the first base is extended from or is coupled to the first end of the inner curved surface of the reflector, and wherein the second base is extended from or is coupled to the second end of the inner surface of the reflector.

6. The refrigerator of claim 1, wherein the reflector, the first base and the second base are formed of the same material.

7. The refrigerator of claim 1, wherein the inner curved surface of the reflector is coated with aluminum.

8. The refrigerator of claim 1, wherein the first ultraviolet LED and the second ultraviolet LED have the same numbers and are disposed symmetrically with each other on the first base and the second base in the longitudinal directions of the first base and the second base, and wherein each of the first base and the second base is a PCB.

9. The refrigerator of claim 1, further comprising a first heat sink and a second heat sink, the first heat sink is in contact with a bottom surface of the first base and the second heat sink is in contact with a bottom surface of the second base.

10. The refrigerator of claim 9, further comprising a heat radiation sheet disposed between the first base and the first heat sink.

11. A refrigerator with ultraviolet LEDs, the refrigerator comprising:

a door;

an internal wall comprising a first wall, a second wall coupled to the first wall, and a third wall coupled to the second wall;

a curved reflector coupled between two walls among the first wall, the second wall and the third wall;

a base coupled to the curved reflector with a predetermined angle; and a plurality of ultraviolet LEDs coupled to the base and configured to emit ultraviolet lights to the curved reflector, wherein the plurality of ultraviolet LEDs becomes an on-state for a period of time when the door closes, wherein the plurality of ultraviolet LEDs becomes an off-state when the door opens, and wherein the plurality of ultraviolet LEDs is disposed toward the curved reflector.

12. The refrigerator of claim 11, wherein the refrigerator further comprises an adhesive disposed between the curved reflector and at least one wall among the first wall, the second wall and the third wall.

13. The refrigerator of claim 11, wherein at least one part of the curved reflector is spaced apart from the two walls among the first wall, the second wall and the third wall.

14. The refrigerator of claim 11, wherein the base is extended from or is coupled to one end of the curved reflector.

15. The refrigerator of claim 11, wherein the base is a PCB.

16. The refrigerator of claim 11, further comprising a heat sink in contact with bottom surfaces of the base.

17. The refrigerator of claim 11, wherein the reflector comprises a first reflector and a second reflector, wherein the second reflector extends from one end of the first reflector and is symmetrically disposed with the first reflector, wherein the base comprises a first base and a second base, wherein the first base is disposed on the first reflector, and the second base is disposed on the second reflector, wherein the plurality of ultraviolet LEDs comprises a first plurality of ultraviolet LEDs disposed on the first base, and a second plurality of ultraviolet LEDs disposed on the second base, and wherein the refrigerator further comprises a heat sink between the first base and the second base.

18. The refrigerator of claim 1, wherein the first ultraviolet LED and the second ultraviolet LED become in an on-state for a period of time when the door closes, and wherein the first ultraviolet LED and the second ultraviolet LED become in an off-state when the door opens.

19. The refrigerator of claim 1, wherein the first wall is a top wall of the refrigerator, and wherein the second wall is one side wall of the refrigerator.

20. The refrigerator of claim 1, wherein the first wall and the second wall are two side wall of the refrigerator.

* * * * *